US012767190B2

(12) United States Patent
Alton et al.

(10) Patent No.: US 12,767,190 B2
(45) Date of Patent: Oct. 20, 2026

(54) CONVOLUTE FOR A BELLOWS OF A GANGWAY AND BELLOWS OF A GANGWAY

(71) Applicant: Dellner Couplers AB, Falun (SE)

(72) Inventors: Daniel Alton, Staffordshire (GB); Daniel Brittain, Staffordshire (GB)

(73) Assignee: DELLNER COUPLERS AB, Falun (SE)

( * ) Notice: Subject to any disclaimer, the term of this patent is extended or adjusted under 35 U.S.C. 154(b) by 877 days.

(21) Appl. No.: 18/180,460

(22) Filed: Mar. 8, 2023

(65) Prior Publication Data

US 2023/0286554 A1 Sep. 14, 2023

(30) Foreign Application Priority Data

Mar. 11, 2022 (EP) .................................... 22275029

(51) Int. Cl.
*B61D 17/22* (2006.01)
*B60D 5/00* (2006.01)
(Continued)

(52) U.S. Cl.
CPC ............. *B61D 17/22* (2013.01); *B60D 5/003* (2013.01); *B62D 47/025* (2013.01); *F16L 55/07* (2013.01)

(58) Field of Classification Search
CPC ........ B61D 17/22; B61D 17/20; B60D 5/003; B60D 5/00; F16L 55/07; B62D 47/025
See application file for complete search history.

(56) References Cited

U.S. PATENT DOCUMENTS 2,468,590 A * 4/1949 Dean ...................... B61D 17/20 105/21
8,297,197 B2 * 10/2012 Tabellini ................ B60D 5/003 105/20
(Continued)

FOREIGN PATENT DOCUMENTS

CN 202106979 U * 1/2012 ............. B61D 17/22
CN 104512209 A * 4/2015 ............. B60D 5/003
(Continued)

OTHER PUBLICATIONS

Extended European Search Report received for EP Application No. 22275029.1 mailed on Oct. 26, 2022, 8 Pages.

*Primary Examiner* — Cheng Lin
(74) *Attorney, Agent, or Firm* — Howard IP Law Group PC

(57) ABSTRACT

A convolute for a bellows of a gangway, the convolute comprising a first rim and a second rim arranged next to the first rim; a sheet like convolute material that extends from the first rim to the second rim; whereby in an operational position of the convolute, the convolute material takes up a trough-shaped form between the first rim and the second rim; a drainage hole is defined in the convolute material; and a closure closes the drainage hole. The convolute further comprises a drainage control band, whereby the closure forms part of the drainage control band or is attached to the drainage control band, whereby a first band point of the drainage control band is attached to or rests on a first convolute point, whereby the first convolute point is located on the first rim or on the convolute material, but closer to the first rim than to the second rim, and a second band point of the drainage control band is attached to or rests on a second convolute point, whereby the second convolute point is located on the second rim or on the convolute material, but closer to the second rim than to the first rim. The length L1

(Continued)

of a minimum length band path, the minimum length band path being the path with the shortest length that can be taken from the first band point to the second band point while always staying in contact with or leading through the drainage control band, is smaller than the length L2 of a minimum length convolute path, the minimum length convolute path being the path with the shortest length that can be taken from the first convolute point to the second convolute point while always staying in contact with or leading through the convolute material.

14 Claims, 5 Drawing Sheets

(51) Int. Cl.

*B62D 47/02* (2006.01)
*F16L 55/07* (2006.01)

(56) References Cited

U.S. PATENT DOCUMENTS

| | | | | |
|---|---|---|---|---|
| 8,485,108 | B2 * | 7/2013 | Tabellini | B61D 17/22 105/20 |
| 11,718,330 | B2 * | 8/2023 | Hartmann | B61D 17/22 105/18 |
| 12,227,043 | B2 * | 2/2025 | Benedetti | B60D 5/003 |
| 12,485,935 | B2 * | 12/2025 | Meers | B61D 17/22 |

FOREIGN PATENT DOCUMENTS

| | | | | | |
|---|---|---|---|---|---|
| DE | 8417550 | U1 | | 11/1984 | |
| EP | 3750767 | A1 | * | 12/2020 | F16L 55/07 |
| EP | 4186771 | A1 | * | 5/2023 | B61D 17/22 |
| JP | H11222126 | A | | 8/1999 | |
| KR | 200396268 | Y1 | * | 9/2005 | B61D 17/22 |

* cited by examiner

CONVOLUTE FOR A BELLOWS OF A GANGWAY AND BELLOWS OF A GANGWAY

CROSS REFERENCES TO RELATED APPLICATIONS

This application claims priority to and the benefit of European patent application EP 22 275 029.1 filed on Mar. 11, 2022, and all the benefits accruing therefrom under 35 USC 119, the content of which is incorporated by reference herein, in its entirety.

FIELD OF THE INVENTION

The invention is directed to a convolute for a bellows of a gangway. The invention is also directed to a bellows of a gangway. The invention also pertains to a method for draining liquid from a convolute for a bellows.

BACKGROUND

From EP 3 750 767 A1, a convolute for a bellows of a gangway and a bellows of a gangway with such a convolute is known, whereby the convolute comprises a sheet like convolute material with a drainage hole in the convolute material and a closure to close the drainage hole.

The design known from EP 3 750 767 A1 may either prove to be too complex to build or may prove to open the drainage hole too frequently.

SUMMARY

Given this background, a problem to be solved by an aspect of the invention is to provide a convolute for a bellows of a gangway that can be designed more easily and/or can be designed to open only in certain operating conditions of the convolute.

The invention is based on the basic concept to provide the convolute with a drainage control band, whereby the closure forms part of the drainage control band or is attached to the drainage control band and to attach the drainage control band to the convolute in such a manner that the movement of the convolute material itself into certain driving conditions leads to the closure to move away from the drainage hole and allow fluid to pass through the drainage hole.

The invention moves away from having a differential pressure between the outside and the inside of the bellows control the closure of the drainage hole to a concept, where drainage of the convolute automatically takes place in certain driving conditions. In a preferred embodiment, these particular driving conditions are conditions as they arise when the vehicle that comprises the bellows is manoeuvred in a depot. Vehicles that are manoeuvred in a depot typically are manoeuvred around bends that are sharper than the bends the vehicle will travel along during normal operation. Sharp bends lead to the convolutes of the bellows to take up a more spread apart position than they take up during normal operation of the vehicle. In a preferred embodiment, the invention makes use of this circumstance and has the drainage control band designed in such a way that the closure that forms part of the drainage control band or is attached to the drainage control band moves away from the drainage hole in the driving conditions, where the convolute is spread apart by a substantial amount.

To put into practice this basic concept, the invention suggests the convolute to have a drainage control band, whereby the closure forms part of the drainage control band or is attached to the drainage control band.

As will be described in more detail below, the drainage control band may be a sheet like element that can be made to lie over the drainage hole on one side, thereby closing the drainage hole. In such a design, that part of the drainage control band that lies over the drainage hole and hence closes the drainage hole would be considered a closure that forms part of the drainage control band.

As will be described in further detail below, a closure can also contain a plug. In an embodiment, where the drainage control band is made of a sheet like material, a plug can be provided by a knob protruding from the sheet like material that makes the drainage control band. This knob, which will provide the plug, can be at least partially, preferably completely, inserted into the drainage hole, thereby closing the drainage hole. Given that it might be difficult to choose an appropriate diameter for a plug and to appropriately insert such a plug into the sheet like convolute material, the closure can also be a combined closure, whereby a part of a sheet like drainage control band and a knob protruding from that drainage control band jointly make up the closure, the drainage hole hence being partially closed by the knob residing within the drainage hole, but also being closed by sheet like material of the drainage control band lying across the opening of the drainage hole.

The drainage control band might also be of different design shape and material, for example may be a cord, for example may be an elastic cord. In such a design, the closure may be a plug that by way of a link, for example a chain or a further cord, is attached to the cord-like drainage control band. In one embodiment, tensioning a previously bow-shaped drainage control band can lead to a pulling force being applied via the link to the plug and for the plug to be pulled out of the drainage hole. Equally preferred, in an embodiment, where the drainage control band is provided by a cord, the closure could be a sheet like material that lies across the opening of the drainage hole and that is at least partially pulled up when the drainage control band is tensioned. Such a sheet like closure can be combined with a knob that operates as a plug as described in the prior embodiment.

To translate the spreading movement of the convolute material into an opening movement for the closure, the invention suggests for a first band point of the drainage control band to be attached to or to rest on a first convolute point, wherein the first convolute point is located on the first rim or on the convolute material, but closer to the first rim than to the second rim. The invention hence encompasses an embodiment, where the first band point of the drainage control band is attached to a first convolute point, whereby the first convolute point is located on the first rim. The invention also pertains to embodiments, where the first band point of the drainage control band rests on a first convolute point, whereby the first convolute point is located on the first rim. The invention also pertains to embodiments, whereby the first band point of the drainage control band is attached to a first convolute point, whereby the first convolute point is located on the convolute material, but closer to the first rim than to the second rim.

The attachment of the first band point to a first convolute point, be it to the first rim or be it to the convolute material, preferably is made by way of sewing or by way of gluing or by way of stitching. Also welding or a Velcro connection might be considered as means of attaching the drainage control band with the first band point to the first convolute point.

The invention suggests for a second band point of the drainage control band to be attached to or to rest on a second convolute point, wherein the second convolute point is located on the second rim or on the convolute material, but closer to the second rim than to the first rim. The invention hence encompasses an embodiment, where the second band point of the drainage control band is attached to a second convolute point, whereby the second convolute point is located on the second rim. The invention also pertains to embodiments, where the second band point of the drainage control band rests on a second convolute point, whereby the second convolute point is located on the second rim. The invention also pertains to embodiments, whereby the second band point of the drainage control band is attached to a second convolute point, whereby the second convolute point is located on the convolute material, but closer to the second rim than to the first rim.

The attachment of the second band point to a second convolute point, be it to the second rim or be it to the convolute material, preferably is made by way of sewing or by way of gluing or by way of stitching. Also welding or a Velcro connection might be considered as means of attaching the drainage control band with the second band point to the second convolute point.

The basic concept of the invention in one embodiment can be put into practice by way of bringing the design of the drainage control band in a certain relationship to the design of the convolute material. According to the invention, the drainage control band has a minimum length band path. The minimum length band path is understood to be the path with the shortest length that can be taken from the first band point to the second band point while always staying in contact with or leading through the drainage control band. The minimum length band path hence either travels along the surface or parts of the surface of the drainage control band or travels through the drainage control band. The length of the minimum length band path is referred to as the length L1. The convolute material is considered to have a minimum length convolute path. The minimum length convolute path is understood to be the path with the shortest length that can be taken from the first convolute point to the second convolute point, while always staying in contact with or leading through the convolute material. The minimum length convolute path hence either travels along the surface or parts of the surface of the convolute material or travels through the convolute. The length of the minimum length convolute path is referred to as the length L2.

The basic concept of the invention can be put into practice, if the drainage control band is designed such that the length L1 is smaller than the length L2. If the length L1 is smaller than the length L2, this can means that the part of the convolute material that is arranged between the first convolute point and the second convolute point is more curved (more bent, less straight) than the material of the drainage control band between the first band point and the second band point. This leads to the effect that any movement of the convolute that spreads the convolute more apart or straightens the convolute further automatically leads to a tensioning of the drainage control band. The tensioning of the drainage control band can be used to lift the closure from the drainage hole and thereby open up the drainage hole.

According to the invention, the sheet like convolute material in an operational position of the convolute takes up a trough-shaped form between the first rim and the second rim. The trough-shaped form of the convolute material will change as the convolute travels through different operational positions.

The convolute according to the invention comprises a first rim and a second rim arranged next to the first rim. In a preferred embodiment, the convolute can be brought into an operational position, where the first rim is parallel to the second rim. In a preferred embodiment, the convolute can be brought into an operational position, where the first rim and the second rim are at the same height. Typically, the operational position, where the first rim is parallel to the second rim and at the same height as the second rim is the operational condition, where the vehicle that contains the bellows that contains the convolute according to the invention travels along a straight line on a flat plane. The first rim and/or the second rim may be the free end of the sheet like convolute material. The first rim and/or the second rim may, however, also be provided by a lath or a crimping rod as they are commonly used to attach the rim of one convolute to the rim of a neighbouring convolute.

The convolute has a sheet like convolute material that extends from the first rim to the second rim. The convolute material can be a textile material or can be an impregnated textile material or can be a material with several sheet like layers.

In the convolute according to the invention, a drainage hole is provided in the convolute material. The drainage hole is a through-hole that leads from the inside of the convolute to the outside of the convolute. The drainage hole may have any cross-sectional form. In the most simple design, the drainage hole has a circular cross-section that stays constant along the extent of the drainage hole. Designs are, however, also feasible, where the cross-section of the drainage hole changes along the depth of the drainage hole, for example whereby the cross-section of the drainage hole gets smaller or gets bigger along the depth of the drainage hole. The shape of the drainage hole can also be adapted to particular shapes of the closure, for example for cases, where the closure is or contains a plug; for example the cross section of the drainage hole in the depth-direction (which is the direction from the inside of the convolute to the outside of the convolute) may have the shape of a truncated cone and hence is adapted to receive a plug that is cone shaped or has the shape of a truncated cone.

According to the invention, the convolute is provided with a closure to close the drainage hole. As already indicated above, the closure can be a sheet like material that lies across the drainage hole and thereby closes the drainage hole. In an embodiment, where the closure is provided at least in part by a sheet like material, the sheet like part of the closure can be a part of a larger sheet like object. For example, where the closure forms part of the drainage control band, the drainage control band can be designed from a sheet like material, whereby the closure then would be formed by a part of this sheet like material. Designs are also feasible, however, where the closure is made from a sheet like material and whereby this sheet like material is attached to the drainage control band, the drainage control band then being a different object than the sheet like material. For example, the drainage control band may be an elastic cord and the closure may be a sheet like material, whereby the sheet like material is connected to the drainage control band that is a cord. Such a connection may, for example, be provided by a further cord or by a further band or a different type of link. As already indicated, the closure can also contain a plug. The closure can be a plug, which is to be understood that the closure consists of a plug. The closure can, however, also be provided by an object, which comprises a plug, but also contains other elements that operate as a closure, for example can contain a sheet like material with a plug in the form of a knob protruding from this sheet like material, whereby both the sheet like material as it lies across the drainage hole and the plug that is inserted in the drainage hole jointly lead to the closure of the drainage hole.

In a preferred embodiment, the drainage control band is made from a sheet like material. The drainage control band in at least one specific operating position of the convolute could be a sheet like material that lies on an inward facing surface of the sheet like convolute material. In a preferred embodiment the drainage control band that is from a sheet like material can be arranged to lie across the drainage hole. In this embodiment, the area where the sheet like drainage control band lies across the drainage hole forms part of the closure.

In a preferred embodiment, the ratio of L2 divided by L1 is equal to or larger than 1.005, more preferably equal to or larger than 1.01, more preferably equal to or larger than 1.1, more preferably equal to or larger than 1.2.

In a preferred embodiment, the material of the drainage control band is more flexible than the convolute material which is understood to mean that when applying the same pulling force to the drainage control band and to the convolute material the drainage control band is elongated by a larger amount than the convolute material.

In a preferred embodiment, in at least one operational position of the convolute, the convolute material takes up a trough-shaped form between the first rim and the second rim, while in this particular operational position, the closure closes the drainage hole and whereby in this particular operational position, the drainage control band has a bow-shaped or trough-shaped cross-section in a plane that is perpendicular to the first rim. In a preferred embodiment, the bow of the drainage control band is less deep than the trough shape of the convolute material. In a preferred embodiment within this particular embodiment, the drainage control band is made from a sheet like convolute material, whereby in this particular operational position, the sheet like drainage control band lies with an outside surface on an inward pointing surface of the trough-shaped convolute material.

In a preferred embodiment, by way of choosing the appropriate size of the drainage control band in relation to a size of the convolute material, the convolute is designed such that at a first operational position of the convolute, the convolute material takes up a trough-shaped form between the first rim and the second rim and the closure closes the drainage hole and the drainage control band has a bow-shaped or trough-shaped cross-section in a plane that is perpendicular to the first rim and at a second operational position of the convolute, the convolute material takes up a trough-shaped form between the first rim and the second rim and the closure does not close the drainage hole and the drainage control band has a bow-shaped or trough-shaped cross-section or straight line form in a plane that is perpendicular to the first rim, whereby the convolute material is more straightened (less trough-shaped) in the second operational position than in the first operational position and the drainage control band is more straightened (less trough-shaped) in the second operational position than in the first operational position. In a preferred embodiment, starting from the first operational position, the second operational position is reached by way of moving the first rim away from the second rim. This will lead to a straightening of the convolute material.

In a preferred embodiment, by way of choosing the appropriate size of the drainage control band in relation to a size of the convolute material, the convolute is designed such that in a first operational position of the convolute the convolute material takes up a trough-shaped form between the first rim and the second rim and the closure closes the drainage hole and the drainage control band has a bow-shaped or trough-shaped cross-section in a plane that is perpendicular to the first rim, whereby the shortest distance between the first band point and the second band point in this first operational condition is D1 and in a second operational position the closure does not close the drainage hole and the shortest distance between the first band point and the second band point in this second operational condition is D2 and D2 is larger than D1.

While the above-identified length L1 is measured along a path that stays in contact with or leads through the drainage control band, the shortest distance between the first band point and the second band point that in the first operational position is D1 and in the second operational position is D2 is measured directly from the first band point to the second band point, which means that it is typically measured through the air that is surrounded by the convolute material.

In a preferred embodiment, the drainage control band is arranged on a first side of the convolute, especially preferred on the inside of the convolute, while a return spring is arranged or attached to a second side of the convolute material, preferably to the outside of the convolute, whereby the spring is also attached to the closure, whereby either the return spring at least partially reaches through the drainage hole when the closure does not close the drainage hole or a connector that connects the closure to the return spring at least partially reaches through the drainage hole when the closure does not close the drainage hole. The return spring can be used to facilitate the return of the closure to a position, where it closes the drainage hole. As soon as the convolute takes up an operational position, where the drainage control band relaxes downwards towards the drainage hole, the return spring can ensure that the closure returns to the position, where it closes the drainage hole.

In a preferred embodiment, the convolute has one drainage hole and one closure, especially preferred only one drainage hole and only one closure that closes the only one drainage hole. In a preferred embodiment the one drainage hole and the one closure are arranged in the middle of a bottom part of the convolute. Alternatively, the one drainage hole and the one closure are arranged offset from middle of a bottom part of the convolute. Moving a vehicle that has a bellows that has a convolute according to the invention around a sharp bend leads to the first rim being moved closer to the second rim at one end of the first rim and the second rim, while at the opposite end of the first rim and the second rim, the first rim and the second rim are moved further apart. The spreading of the convolute material that in a preferred embodiment of the invention is used to automatically open the drainage hole through the straightening of the drainage control band hence occurs more strongly towards the end of the first rim and the second rim than in the middle of the bottom part of the convolute. Hence the arrangement of the one hole offset from the middle of the bottom leads to a better opening of the drainage hole, but of course only for travel around those bends, where the drainage hole is arranged closer to the outside of the curve.

In an alternative embodiment, the convolute may contain two or more drainage holes and two or more closures for the two or more drainage holes. In embodiments with two drainage holes, these are preferably arranged offset from the middle of the bottom part of the convolute, preferably one drainage hole towards one end of the bottom part of the convolute and one drainage hole towards the opposite end of the bottom part of the convolute. Depending of the direction of the bend, this will lead to the one drainage hole being opened that is arranged towards the outside of the bend as the convolute material will be spread there, while the convolute material at the other drainage hole (the one that in this bend will be arranged closer to the inside of the curve) will typically not be spread.

The convolute according to the invention preferably is made up of four general parts, namely a top part, a first side part, a second side part and a bottom part. The top part at one end is connected to the top of the first side part by way of a corner piece. The top part at its opposite end is connected to the top of the second side part by way of a corner piece. The bottom part at one end is connected to the bottom of the first side part by way of a corner piece. The bottom part at its opposite end is connected to the bottom of the second side part by way of a corner piece. Each of the four parts, namely the top part, the first side part, the second side part and the bottom part are elongated parts that each primarily extend along a longitudinal axis. Typically with convolutes of bellows and hence in a preferred embodiment of the invention, at least in one operational position the longitudinal axis along which the top part extends is arranged parallel to the longitudinal axis along which the bottom part extends. Typically with convolutes of bellows and hence in a preferred embodiment of the invention, at least in one operational position the longitudinal axis along which the first side part extends is arranged parallel to the longitudinal axis along which the second side part extends. In a preferred embodiment in this operational position, the longitudinal axis along which the first part extends is perpendicular to the longitudinal axis along which the bottom part extends and/or perpendicular to the longitudinal axis along which the top part extends. In a preferred embodiment in this operational position, the longitudinal axis along which the second part extends is perpendicular to the longitudinal axis along which the bottom part extends and/or perpendicular to the longitudinal axis along which the top part extends.

In a preferred embodiment the drainage hole is arranged in the bottom part. If several drainage holes are provided, preferably the several drainage holes are all provided in the bottom part.

In a preferred embodiment, a. the top part has a first rim and a second rim arranged next to the first rim and a sheet like convolute material that extends from the first rim to the second rim, whereby in an operational position of the convolute, the convolute material takes up a trough-shaped form between the first rim and the second rim, and
b. the bottom part has a first rim and a second rim arranged next to the first rim and a sheet like convolute material that extends from the first rim to the second rim, whereby in an operational position of the convolute, the convolute material takes up a trough-shaped form between the first rim and the second rim, and
c. the first side part has a first rim and a second rim arranged next to the first rim and a a sheet like convolute material that extends from the first rim to the second rim, whereby in an operational position of the convolute, the convolute material takes up a trough-shaped form between the first rim and the second rim, and
d. the second side part has a first rim and a second rim arranged next to the first rim and a sheet like convolute material that extends from the first rim to the second rim, whereby in an operational position of the convolute, the convolute material takes up a trough-shaped form between the first rim and the second rim.

Preferably when the first rim, the second rim and the convolute material arranged between said first rim and said second rim is being referred to in this description (and if nothing else is explicitly stated) in a preferred embodiment this is to be understood as reference of a first rim, a second rim and a convolute material arranged between said first rim and said second rim of the bottom part of the convolute. This saves having to make reference to "of the bottom part of the convolute" throughout the other parts of the description.

In a preferred embodiment, the convolute according to the invention has an operational position, where the first rim is parallel to the second rim and the first rim and the second rim are arranged on the same height and whereby the convolute material takes up its trough-shaped form below the first rim and the second rim, the convolute according to the invention preferably is designed mirror-symmetrical about a vertical plane that is equidistant from the first rim and the second rim. Preferably, in such a design, the drainage opening is arranged at the cross-section of the vertical plane with the convolute material.

In a preferred embodiment, the drainage hole in an operational position, where the first rim and the second rim are at the same height is arranged at that point of the convolute material that is the furthest away from the horizontal plane that contains the first rim and the second rim.

The invention as regards the convolute can also be described such that the convolute comprises a. a first rim and a second rim arranged next to the first rim,
b. a sheet like convolute material that extends from the first rim to the second rim, whereby in an operational position of the convolute, the convolute material takes up a trough-shaped form between the first rim and the second rim,
c. a drainage hole in the convolute material,
d. a closure to close the drainage hole,
e. a connection between the first rim and/or the second rim and the closure, whereby increasing the distance between a part of the first rim and a part of the second rim, causes the connection between the first rim and/or the second rim and the closure to at least partially move the closure and to at least partially open the drainage hole.

In a preferred embodiment, this alternative description of the convolute according to the invention is supplemented with at least one of the features described in the above paragraphs that describe the convolute disclosed herein.

The invention also pertains to a bellows for a gangway. The bellows comprises several convolutes. Each convolute comprises a first rim and a second rim arranged next to the first rim and a sheet like convolute material that extends from the first rim to the second rim, whereby in an operational position of the convolute, the convolute material takes up a trough-shaped form between the first rim and the second rim, the first rim of one convolute being connected to the second rim of the neighboring convolute. According to the invention, at least one of the convolutes of the bellows is a convolute according to the invention.

In a preferred embodiment, the majority (more than 50%) and in an even more preferred embodiment, the overwhelming majority (more than 75%) of the convolutes of the bellows are convolutes according to the invention. In an especially preferred embodiment, all convolutes of the bellows are convolutes according to the invention.

In a preferred embodiment, the bellows has a top part, two side parts and a bottom part, whereby the drainage hole of the convolute according to the invention is arranged in the bottom part.

The invention also pertains to a method for draining liquid from a convolute for a bellows of a gangway, the convolute comprising a. a first rim and a second rim arranged next to the first rim,
b. a sheet like convolute material that extends from the first rim to the second rim, whereby in an operational position of the convolute, the convolute material takes up a trough-shaped form between the first rim and the second rim,
c. a drainage hole in the convolute material,
d. a closure to close the drainage hole,
e. a connection between the first rim and/or the second rim and the closure, whereby according to the method increasing the distance between a part of the first rim and a part of the second rim, thereby causing the connection between the first rim and/or the second rim and the closure to at least partially move the closure and to at least partially open the drainage hole.

In a preferred embodiment the connection between the first rim and/or the second rim and the closure is provided by a drainage control band, whereby the closure forms part of the drainage control band or is attached to the drainage control band, whereby a. a first band point of the drainage control band is attached to or rests on a first convolute point, whereby the first convolute point is located on the first rim or on the convolute material, but closer to the first rim than to the second rim, and
b. a second band point of the drainage control band is attached to or rests on a second convolute point, whereby the second convolute point is located on the second rim or on the convolute material, but closer to the second rim than to the first rim.

In a preferred embodiment, the method according to the invention is is performed with a convolute according to the invention.

The convolute according to the invention preferably is used for performing the method according to the invention.

If a vehicle that has a bellows according to the invention travels around a sharp bend, the first rim and the second rim will be spread out relative to each other. The end of the first rim will move closer to the end of the second rim at the side of the bellows that is on the inside of the curve. The end of the first rim will move further away from the end of the second rim at the side of the bellows that is on the outside curve. The movement of the first rim away from the second rim will spread the convolute material in this area of the convolute. The spreading of the convolute material will lead to the first convolute point to move away from the second convolute point. This will lead to the first band point moving away from the second band point and hence straightening or even stretching the drainage control band. The drainage control band that before the bellows was moved around the sharp bend may have taken up a bow-shaped or trough-shaped form is now straightened which will mean that the drainage control band at least in part, preferably in that part that is arranged in the middle between the first band point and the second band point, is moved away from that part of the convolute material, in which the drainage hole is arranged. This movement will lead to a lifting action on the closure, which will move the closure away from the drainage hole and hence open the drainage hole.

It is anticipated that liquid, especially water, is collected in the trough-shaped convolute material during the daily use of the bellows. As the vehicle that contains the bellows according to the invention is made to travel through sharp bands, especially when travelling through a depot, this will lead to the above sequence of steps and will hence lead to the closure moving away from the drainage hole and opening the drainage hole. Hence, in this operational situation, the liquid, especially the water, is allowed to be drained from the bellows. It is anticipated that the amount of liquid, especially water, that is collected in between two trips to the depot in a vehicle that contains the bellows according to the invention is sufficiently small that it is sufficient to drain the convolute only in those times when the vehicle that contains the bellows according to the invention is travelling through a depot.

The convolute according to the invention, the bellows according to the invention and the method according to the invention provide the advantage that an automatic control of the state of the closure can be linked to certain spatial arrangements of the convolute. This makes the automatic control of the state of the closure independent from any pressure difference between the inside and the outside of the convolute. Furthermore, because the automatic control of the state of the closure can be linked to certain spatial arrangements of the convolute, these conditions can be chosen such that they are only taken up by the convolute in specific locations. As described above, according to one aspect of the invention, increasing the distance between a part of the first rim and a part of the second rim can be used to cause the connection between the first rim and/or the second rim and the closure to at least partially move the closure and to at least partially open the drainage hole. If the convolute now is designed in such a manner, that in order to cause the connection between the first rim and/or the second rim and the closure to at least partially move the closure and to at least partially open the drainage hole, the distance between the part of the first rim and the part of the second rim needs to be increased by such a substantial amount that this does not occur while the vehicle that comprises the bellows that comprises the convolute travels along a normal track, but only when the vehicle travels along an extremely curved track, e.g. a track in a depot, this provides the advantage that the closure will stay closed while the vehicle travels along a normal track. Hence the invention provides that advantage that just by way of choosing the appropriate design of the convolute, it can be ensured that the closure stays closed while the vehicle travels along normal tracks. Hence, the invention could be implemented, for example, to ensure that the closure stays closed as the vehicle enters into or travels through or leaves a tunnel while traveling along a normal track.

BRIEF DESCRIPTION OF THE DRAWINGS

The invention will now be explained with reference to Figures that only show examples of the invention. In the Figures.

DETAILED DESCRIPTION

Figure 1:
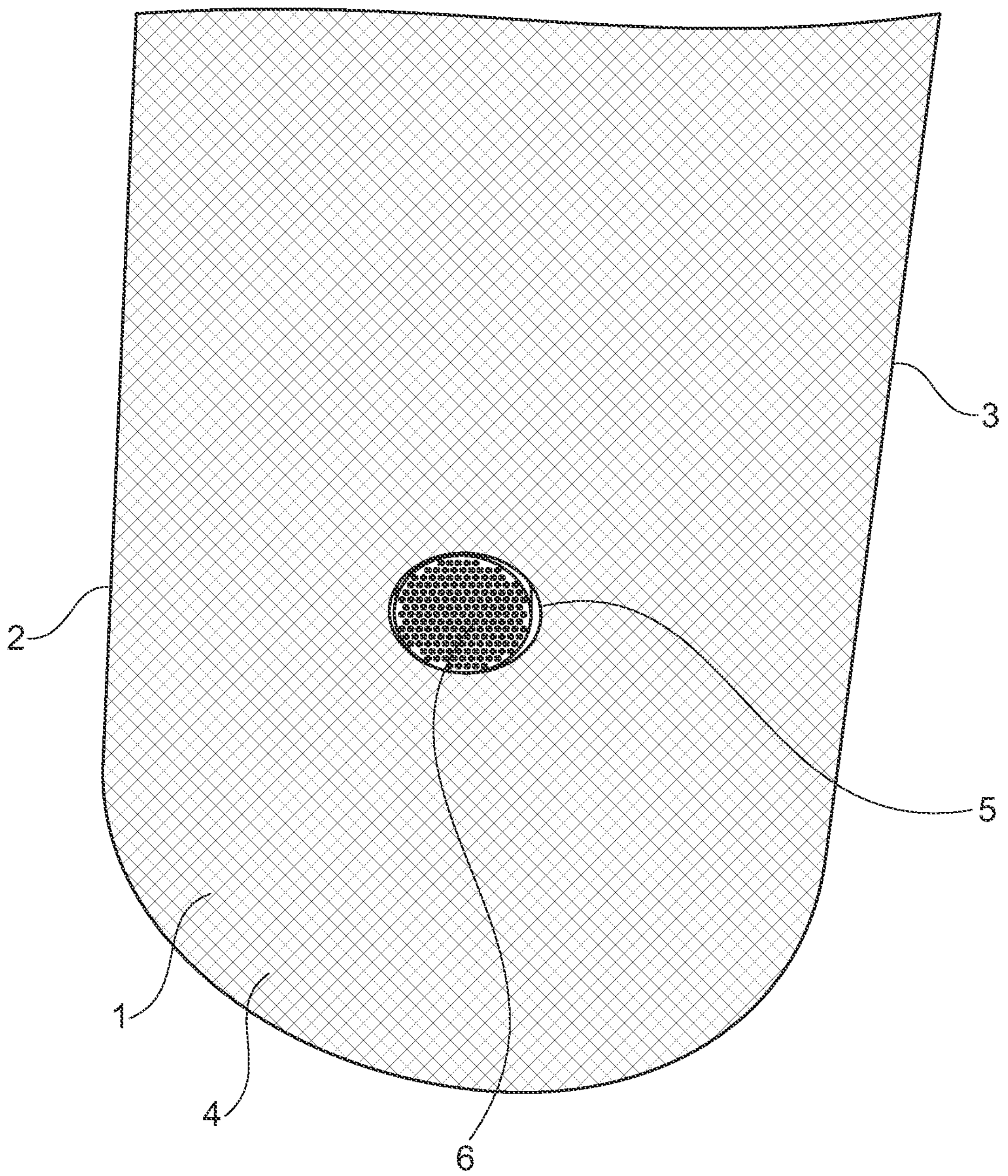
FIG. 1 shows a perspective view onto the underside of a part of convolute according to the invention according to a first embodiment
Figure 2:
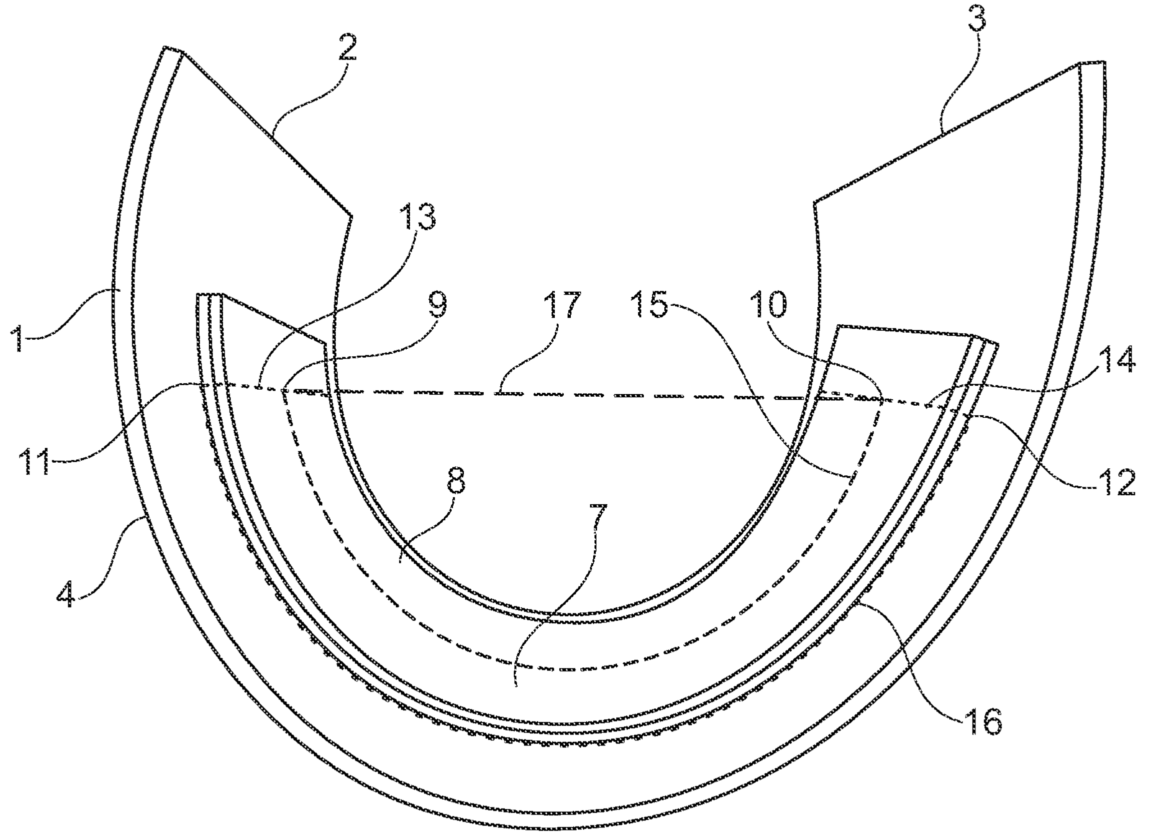
FIG. 2 shows a perspective view from the side unto the part of the convolute of FIG. 1 in a first operational position.
Figure 3:
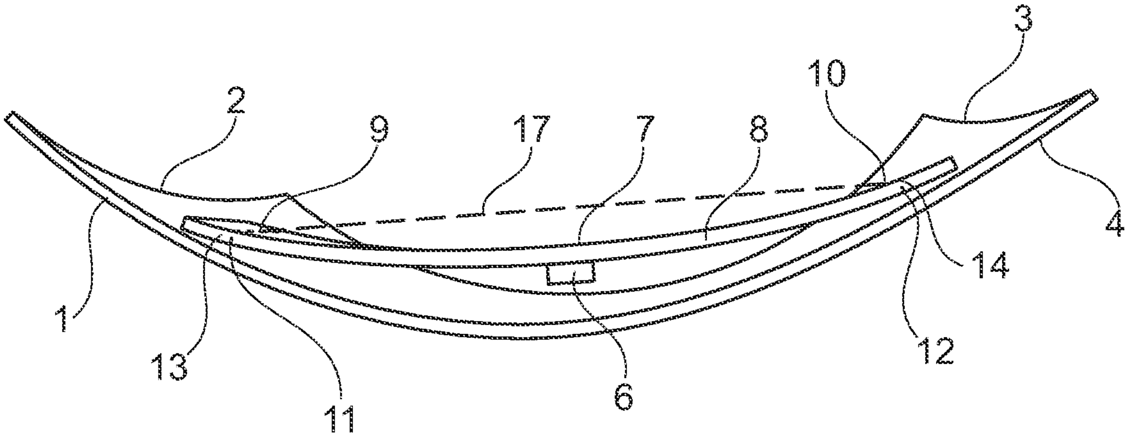
FIG. 3 shows a perspective view from the side unto the part of the convolute of FIG. 1 in a first operational position.

FIGS. 1 to 3 show a first embodiment of a convolute 1 according to the invention. The convolute 1 has a first rim 2 and a second rim 3 arranged next to the first rim 2. A sheet like convolute material 4 extends from the first rim 2 to the second rim 3. In the operational position of the convolute 1 shown in FIG. 2, the convolute material 4 takes up a trough-shaped form between the first rim 2 and the second rim 3. In the embodiment shown in FIGS. 1 to 3, the first rim 2 is provided by one end of the sheet like convolute material 4 and the second rim 3 is provided by the opposite end of the sheet like convolute material 4.

As can be best seen from FIG. 1, a drainage hole is provided in the convolute material 4. As can be seen from FIG. 1, in the operational position taken up by the convolute in FIG. 1, a plug 6 that forms part of a closure 7 is arranged inside the drainage hole 5.

As can best be seen from FIGS. 2 and 3, a drainage control band 8 is provided. The drainage control band has a first band point 9 and a second band point 10. The first band point 9 is attached to a first convolute point 11 by way of a stitching 13. The first convolute point 11 is on the convolute material 4, but closer to the first rim 2 than to the second rim 3. The second band point 10 is attached to a second convolute point 12 by way of a stitching 14. The second convolute point 12 is located on the convolute material 4, but closer to the second rim 3 than to the first rim 2.

As highlighted in FIGS. 2 and 3, a minimum length band path 15 (highlighted in FIGS. 2 and 3 by dashed lines) is the path with the shortest length that can be taken from the first band point 9 to the second band point 10 while always staying in contact with or leading through the drainage control band 8. The length of the minimum length band path 15 is L1. As highlighted in FIGS. 2 and 3, a minimum length convolute path 16 (highlighted in FIGS. 2 and 3 by dashed lines) is the path with the shortest length that can be taken from the first convolute point 11 to the second convolute point 12 while always staying in contact with or leading through the convolute material 4. The length of the minimum length convolute path 16 is L2. L1 is smaller than L2.

The drainage control band in the embodiment of FIGS. 1 to 3 is made from a sheet like material. The closure 7 of the convolute 1 is provided by a part of the sheet like drainage control band 8, namely that part that is located around the drainage hole, and by the plug 6 that like a knob protrudes from the sheet like drainage control band 8. As can be seen from FIG. 1, the plug 6 closes the major part of the drainage hole 5, put is not arranged in the drainage hole 5 in a press-fit way. Hence, a little clearance remains around the plug 6 inside the drainage hole. Because the sheet like drainage control band 8 is, however, arranged to lay over the drainage hole 5 in the operational condition seen in FIG. 2, this additional part aids in closing the drainage hole 5 and hence belongs forms part of the closure 7.

In the operational position of the convolute 1 shown in FIG. 2, where the convolute material 4 takes up a trough-shaped form between the first rim 2 and the second rim 3, the closure 7 closes the drainage hole 5 and the drainage control band 8 in this particular embodiment has a bow-shaped cross-section in a plane that is perpendicular to the first rim 2. The sheet like drainage control band 8 lies on the inward facing surface of the sheet like convolute material 4.

In the operational position shown in FIG. 2, which could be seen as a first operational position of the convolute 1, the shortest distance (highlighted by the dashed line 17 in FIG. 2) between the first band point 9 and the second band point 10 in this first operational condition is D1.

In the operational position shown in FIG. 3, which could be seen as a second operational position, the closure 7 does not close the drainage hole 5 and the shortest distance (highlighted by the dashed line 18 in FIG. 3) between the first band point 9 and the second band point 10 in this second operational condition is D2.

D2 is larger than D1.

As can be seen from comparing FIG. 2 to FIG. 3 spreading the convolute material 4, which means nothing else than increasing the shortest distance the first band point 9 and the second band point 10 due to the design-rule "L1 smaller than L2" leads to the previously bow-shaped drainage control band 8 being straightened more than the convolute material 4 and hence for the drainage control band 8 to lift of the inward facing surface of the convolute material 4 and hence to open the drainage hole 5.

Hence if the convolute 1 is brought into an operational position like the one shown in FIG. 3, the drainage hole 5 is automatically opened and liquid that has been collected in the trough-shaped convolute material 4 can be drained. Bringing the convolute 1 back into an operational position shown in FIG. 2 spreads the closure 7 over the drainage hole 5 and inserts the knob-shaped plug 6 back into the drainage hole 5, closing the drainage hole automatically.

FIGS. 1 to 3 only show a short part of the convolute 1 in order to explain the working principle of the invention.

Figure 4:
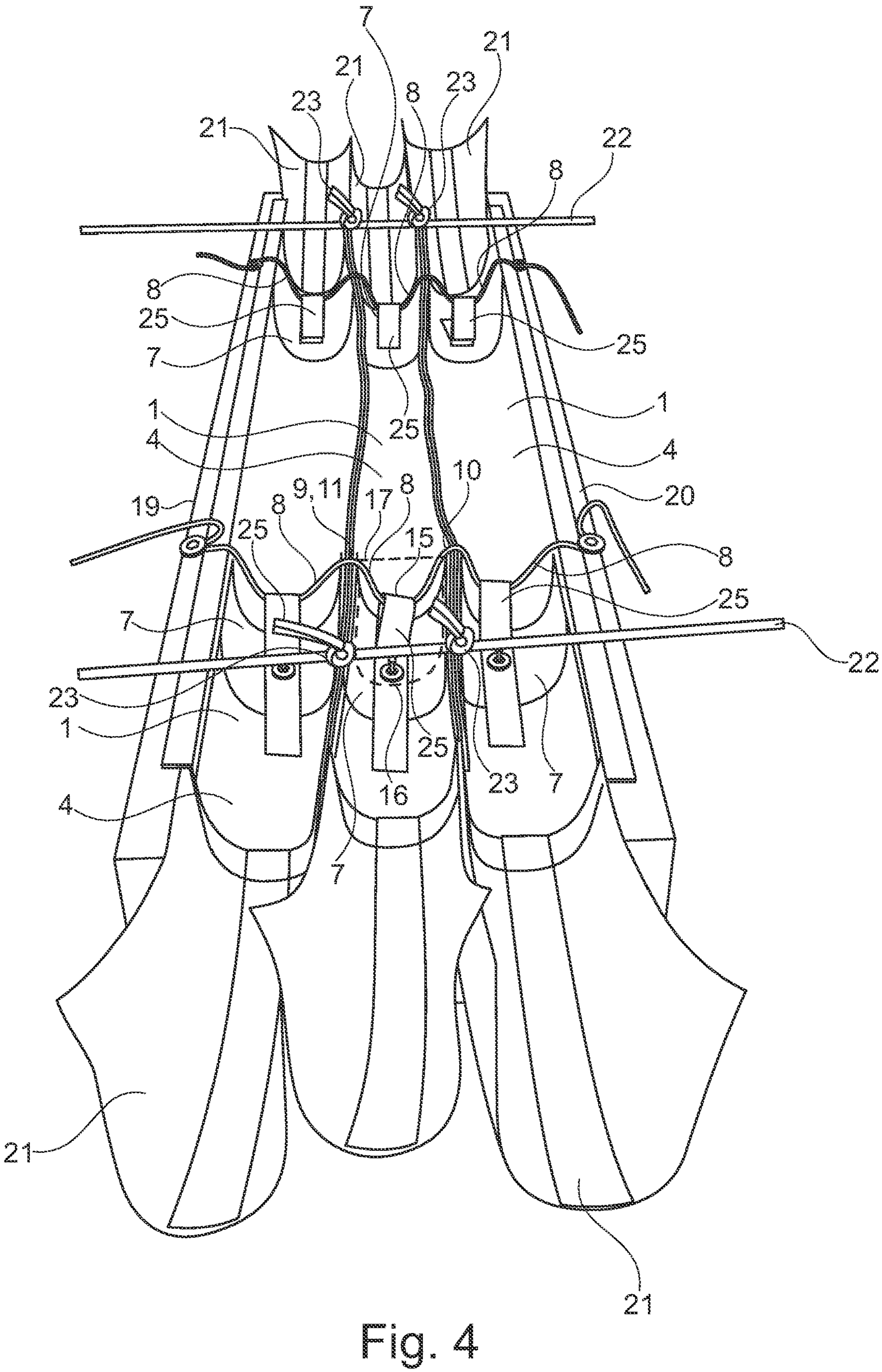
FIG. 4 shows a perspective view unto an exemplary arrangement of the parts of three convolutes according to the invention that will form the bottom part of a bellows according to a second embodiment.
Figure 5:
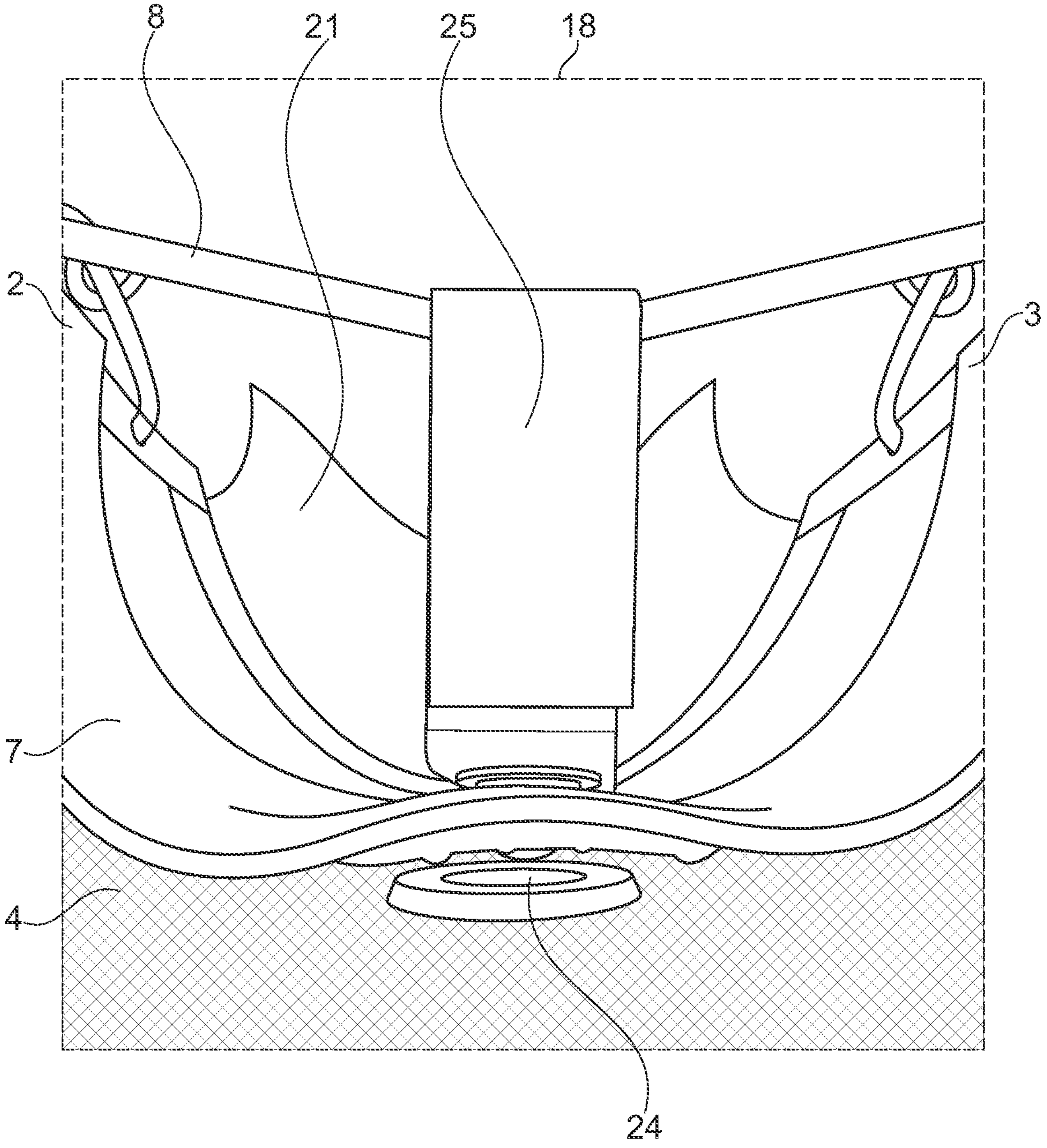
FIG. 5 shows a perspective close-up view from the side unto a detail of a part of one convolute of the convolutes of FIG. 4 in an operational position.
Figure 6:
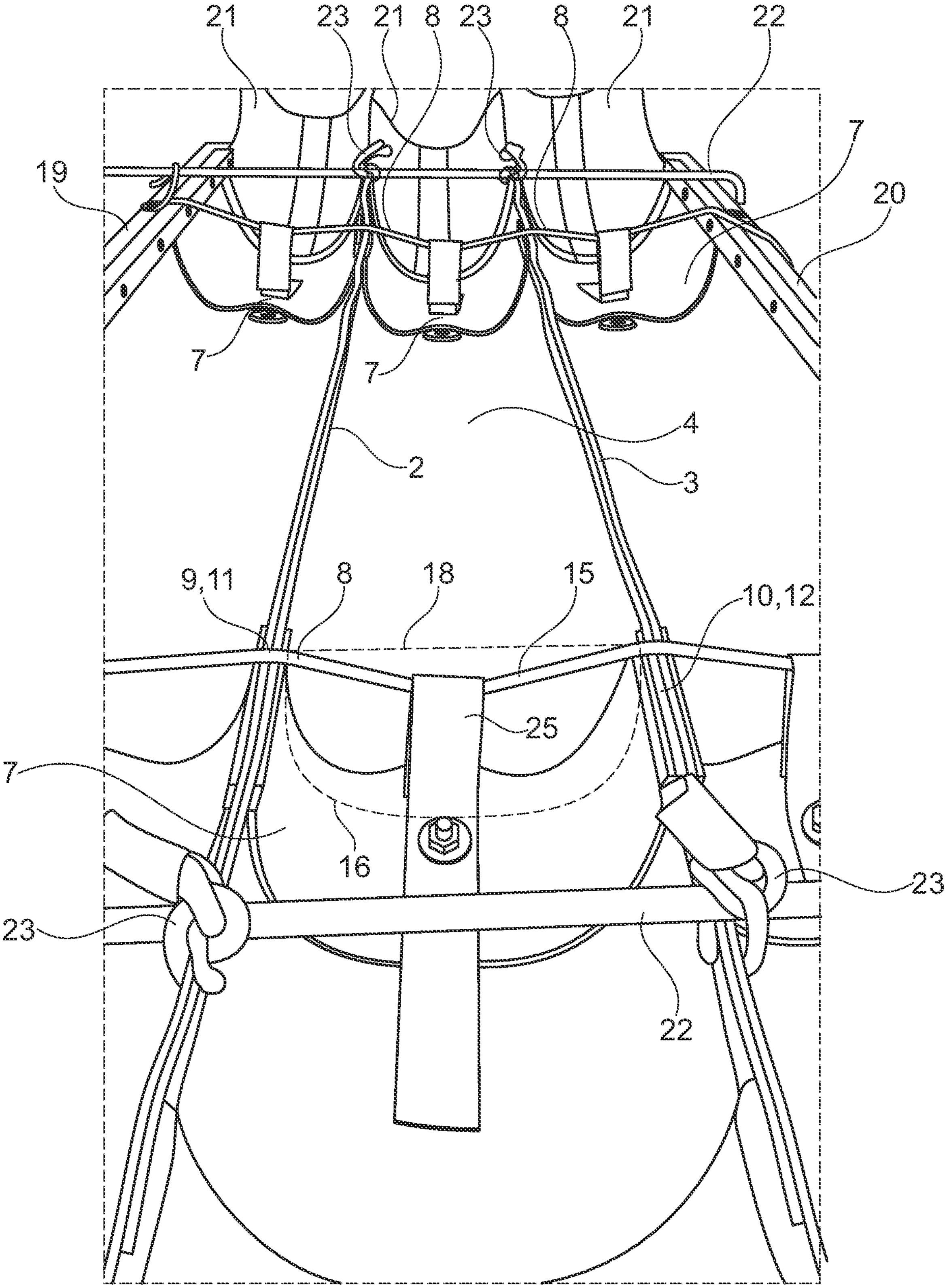
FIG. 6 shows a perspective view from the side unto a detail of a part of the convolutes of FIG. 4, the convolutes being in the same operational position as the convolute shown in FIG. 5.

The FIGS. 4 to 6 show a second embodiment of the invention. FIG. 3 shows the bottom parts of three convolutes 1 arranged next to each other. For the left hand convolute 1, the first rim 2 is attached to a frame 19 and the second rim 3 is attached to the first rim 2 of the middle convolute 1. The second rim 3 of the middle convolute 1 is attached to the first rim 2 of the right hand convolute 1. The second rim 3 of the right hand convolute 1 is attached to a frame 20. For each convolute 1 in FIG. 4, corner pieces 21 are also shown that would provide the connection of the bottom parts of the convolutes 1 shown in FIG. 4 to side parts of the convolutes 1.

FIG. 4 shows two rods 22. For each rod, a point on the joined second rim 3 of the left hand convolute 1 and first rim 2 of the middle convolute 1 is attached to the rod 22 by a cord 23 to hold up the joined second rim 3 of the left hand convolute 1 and first rim 2 of the middle convolute 1. For each rod, a point on the joined second rim 3 of the middle convolute 1 and first rim 2 of the right hand convolute 1 is attached to the rod 22 by a cord 23 to hold up the joined second rim 3 of the left hand convolute 1 and first rim 2 of the middle convolute 1.

In the embodiment of FIGS. 4 to 6, the drainage control band 8 is provided by an elastic cord. In the embodiment of FIGS. 4 to 6 two drainage control bands 8 are provided, because each convolute 1 is provided with two drainage holes. In the FIG. 4 the drainage holes 5 of the convolutes 1 are not visible, because each drainage hole 5 is closed by a sheet like closure 7. FIG. 5 shows a raised circular rim 24 that encircles the drainage hole 5. The raised circular rim 24 improves the closure of the drainage hole 5 by the sheet like closure 7.

In the embodiment shown in FIGS. 4 to 6, the first band point 9 of the respective drainage control band 8 rests on a first convolute point 11, whereby the first convolute point 11 is located on the first rim 2 of the respective convolute. The second band point 10 of the drainage control band 8 rests on a second convolute point 12, whereby the second convolute point 12 is located on the second rim 3. The length L1 of the minimum length band path 15 is smaller than the length L2 of the minimum length convolute path.

The sheet like closure 7 in the embodiment of FIGS. 4 to 6 is attached to the drainage control band 8 by a link 25.

The embodiment of FIGS. 4 to 6 shows two long elastic cord that each from frame 19 to frame 20 and are attached to frame 19 and frame 20. The drainage control band 8 of the respective one of the total of three convolutes 1 shown in FIGS. 4 and 6 is provided by a part of the long elastic cord.

In the operational position of the convolute 1 shown in FIG. 4, where the convolute material 4 takes up a trough-shaped form between the first rim 2 and the second rim 3, the closure 7 closes the drainage hole 5 and the drainage control band 8 in this particular embodiment has a bow-shaped cross-section in a plane that is perpendicular to the first rim 2. The cord that forms the drainage control band 8 bends downwards.

In the operational position shown in FIG. 4, which could be seen as a first operational position of the convolute 1, the shortest distance (highlighted by the dashed line 17 in FIG. 2) between the first band point 9 and the second band point 10 in this first operational condition is D1.

In the operational position shown in FIGS. 5 and 6, which could be seen as a second operational position, the closure 7 does not close the drainage hole 5 and the shortest distance (highlighted by the dashed line 18 in FIG. 3) between the first band point 9 and the second band point 10 in this second operational condition is D2.

D2 is larger than D1.

As can be seen from comparing FIG. 4 to FIGS. 5 and 6 spreading the convolute material 4, which means nothing else than increasing the shortest distance the first band point 9 and the second band point 10 due to the design-rule "L1 smaller than L2" leads to the previously bow-shaped drainage control band 8 being straightened more than the convolute material 4 and hence for the drainage control band 8 to lift the sheet like closure 7 partially from the inward facing surface of the convolute material 4 and hence to open the drainage hole 5.

Hence if the convolute 1 is brought into an operational position like the one shown in FIGS. 5 and 6, the drainage hole 5 is automatically opened and liquid that has been collected in the trough-shaped convolute material 4 can be drained. Bringing the convolute 1 back into an operational position shown in FIG. 4 drops the closure 7 over the drainage hole 5 again, closing the drainage hole automatically.

The invention claimed is:

1. A convolute for a bellows of a gangway, the convolute comprising:

a first rim and a second rim arranged next to the first rim;

a sheet like convolute material that extends from the first rim to the second rim, wherein in an operational position of the convolute, the convolute material takes up a trough-shaped form between the first rim and the second rim;

a drainage hole in the convolute material;

a closure to close the drainage hole;

a drainage control band, wherein the closure forms part of the drainage control band or is attached to the drainage control band;

wherein a first band point of the drainage control band is attached to or resting on a first convolute point, the first convolute point located on the first rim or on the convolute material, but closer to the first rim than to the second rim;

wherein a second band point of the drainage control band is attached to or resting on a second convolute point, the second convolute point located on the second rim or on the convolute material, but closer to the second rim than to the first rim;

wherein a length L1 of a minimum length band path, said minimum length band path being the path with the shortest length that can be taken from the first band point to the second band point while always staying in contact with or leading through the drainage control band, is smaller than a length L2 of a minimum length convolute path, said minimum length convolute path being the path with the shortest length that can be taken from the first convolute point to the second convolute point while always staying in contact with or leading through the convolute material.

2. The convolute according to claim 1, wherein in at least one operational position of the convolute, where the convolute material takes a trough-shaped form between the first rim and the second rim, the closure closes the drainage hole and the drainage control band has a bow-shaped or trough-shaped cross-section in a plane that is perpendicular to the first rim.

3. The convolute according to claim 2, wherein in a first operational position of the convolute, the convolute material takes a trough-shaped form between the first rim and the second rim and the closure closes the drainage hole and the drainage control band has a bow-shaped or trough-shaped cross-section in a plane that is perpendicular to the first rim, wherein the shortest distance between the first band point and the second band point in this first operational condition is D1; and in a second operational position the closure does not close the drainage hole and the shortest distance between the first band point and the second band point in this second operational condition is D2; and wherein D2 is larger than D1.

4. The convolute according to claim 1, wherein the drainage control band is made from a sheet like material or is an elastic cord.

5. The convolute according to claim 1, wherein:

the drainage control band is arranged on a first side of the convolute material (4) and a return spring is arranged on or attached to a second side of the convolute material (4), the return spring also being attached to the closure; and wherein one of: a) the return spring at least partially reaches through the drainage hole when the closure does not close the drainage hole; and b) a connector that connects the closure to the return spring at least partially reaches through the drainage hole when the closure does not close the drainage hole.

6. The convolute according to claim 1, wherein the closure comprises a plug that is at least partially inserted in the drainage hole when the closure closes the drainage hole.

7. A convolute for a bellows of a gangway, the convolute comprising a first rim and a second rim arranged next to the first rim;

a sheet like convolute material that extends from the first rim to the second rim, wherein in an operational position of the convolute, the convolute material takes a trough-shaped form between the first rim and the second rim;

a drainage hole in the convolute material;

a closure to close the drainage hole;

a connection between the first rim and/or the second rim and the closure, wherein increasing the distance between a part of the first rim and a part of the second rim, causes the connection between the first rim and/or the second rim and the closure to at least partially move the closure and to at least partially open the drainage hole.

8. A bellows of a gangway, the bellows comprising a plurality of convolutes, each convolute comprising:

a first rim and a second rim arranged next to the first rim;

a sheet like convolute material that extends from the first rim to the second rim, wherein in an operational position of the convolute, the convolute material takes up a trough-shaped form between the first rim and the second rim;

a drainage hole in the convolute material;

a closure to close the drainage hole;

a drainage control band, wherein the closure forms part of the drainage control band or is attached to the drainage control band;

a first band point of the drainage control band attached to or resting on a first convolute point, wherein the first convolute point is located on the first rim or on the convolute material, but closer to the first rim than to the second rim; and a second band point of the drainage control band attached to or resting on a second convolute point, wherein the second convolute point is located on the second rim or on the convolute material, but closer to the second rim than to the first rim, wherein a length L1 of a minimum length band path, said minimum length band path being the path with the shortest length that can be taken from the first band point to the second band point while always staying in contact with or leading through the drainage control band, is smaller than a length L2 of a minimum length convolute path, said minimum length convolute path being the path with the shortest length that can be taken from the first convolute point to the second convolute point while always staying in contact with or leading through the convolute material;

wherein the first rim of each convolute of said plurality of convolutes is connected to the second rim of a neighboring convolute.

9. The bellows according to claim 8, wherein:

the bellows further comprises a top part, two side parts and a bottom part; and the drainage hole of the convolute is arranged in the bottom part.

10. A method for draining liquid from a convolute for a bellows of a gangway, the convolute comprising a first rim and a second rim arranged next to the first rim, a sheet like convolute material that extends from the first rim to the second rim, wherein in an operational position of the convolute, the convolute material taking a trough-shaped form between the first rim and the second rim, a drainage hole in the convolute material, a closure to close the drainage hole, a connection between the first rim and/or the second rim and the closure, the method comprising:

increasing the distance between a part of the first rim and a part of the second rim, to thereby cause the connection between the first rim and/or the second rim and the closure to at least partially move the closure and to at least partially open the drainage hole.

11. The method according to claim 10, further comprising connecting the first rim and/or the second rim and the closure via a drainage control band.

12. The method according to claim 11, wherein the closure forms part of the drainage control band or is attached to the drainage control band.

13. The method according to claim 12, further comprising:

attaching or resting a first band point of the draining control band onto a first convolute point, wherein the first convolute point is located on the first rim or on the convolute material, but closer to the first rim than to the second rim; and attaching or resting a second band point of the drainage control band onto a second convolute point, wherein the second convolute point is located on the second rim or on the convolute material, but closer to the second rim than to the first rim.

14. The method according to claim 11, further comprising:

arranging the drainage control band on a first side of the convolute material and a return spring on a second side of the convolute material; and attaching the return spring to the closure, such that either the return spring at least partially reaches through the drainage hole when the closure does not close the drainage hole, or providing a connector that connects the closure to the return spring at least partially reaches through the drainage hole when the closure does not close the drainage hole.

* * * * *